INVENTOR
Joseph F. Mifsud

BY John B. Davidson

ATTORNEY

United States Patent Office 3,559,050
Patented Jan. 26, 1971

3,559,050
MOTION DETECTOR WITH TWO SEPARATE WINDINGS AND CIRCUIT INTERCONNECTING THE WINDINGS
Joseph F. Mifsud, Houston, Tex., assignor to Esso Production Research Company, a corporation of Delaware
Filed Sept. 9, 1968, Ser. No. 758,475
Int. Cl. G01p 15/08
U.S. Cl. 324—34                4 Claims

ABSTRACT OF THE DISCLOSURE

A velocity-sensitive geophone is provided with two separate windings on the same coil form. The output signal produced by one winding is coupled to the other through an electrical circuit which amplifies the signal and adjusts the phase thereof. When the signal applied to the second winding is in phase with the output signal of the first winding, the device behaves as an accelerometer, but it behaves as a very low-frequency-sensitive geophone when the signals are 90° out of phase.

BACKGROUND OF THE INVENTION

This invention relates generally to motion detectors such as acoustic transducers and accelerometers, and more particularly to velocity-sensitive tranducers for selectively detecting both low-frequency and high-frequency seismic waves.

One of the more common types of a seismic wave transducer used in connection with seismic prospecting is the velocity-sensitive type utilizing a magnet for producing a strong magnetic field within which is positioned a support carrying an electrical winding. The winding support is suspended from the sturcture for producing the magnetic field and is relatively insensitive to those seismic waves impinging thereon having frequencies which it is desired to detect with the transducer. Seismic waves impinging upon the structure for producing the magnetic field tend to move such structure but will not move the winding support. The result is that an output voltage is produced by the winding which is indicative of the velocity amplitude and the frequency of the elastic waves impinging on the support structure, or case, of the transducer.

Velocity-sensitive transducers capable of detecting low-frequency seismic waves are designed either with a very heavy support for the winding, or with a very limber spring interconnecting the mass with the structure supporting the magnetic field producing means, or both. As a result, low-frequency velocity-type geophones are usually very heavy and must be handled with considerable care in the field to avoid damaging the component parts thereof. This is particularly true when the very limber springs are used to support the structure on which the winding is carried.

At times it is also desired to have a transducer capable of producing output signals responsive to seismic waves impinging thereon, which is proportional to the acceleration of the case or structure supporting the magnetic field producing means. The reason for this is that, in an accelerometer, the amplitude of the output signal increases with frequency for constant particle velocity and often it is desired to have the high-frequency components of detected seismic waves amplified relative to the low-frequency components inasmuch as the earth acts as a distributive filter for high-frequency seismic waves. Usually such compensation is made by designing an amplifier for amplifying the high-frequency components relative to the low-frequency components, with resultant distortion and undesirable phase shift.

SUMMARY OF THE INVENTION

In accordance with one aspect of the invention there is provided a seismic wave transducer of the velocity-sensitive type using an electrical winding means supported in a magnetic field produced by a magnetic field producing supporting structure. As in the prior art, the movement of the magnetic field producing structure responsive to elastic waves impinging thereon has the same velocity as the particle velocity of the elastic wave to be detected. The winding is divided into two sections, one of which preferably has a length which is large compared to the other; preferably the length of the first is at least ten times that of the second. The output signal of the first winding is applied to an electrical circuit including a phase shifting section; the output signal of the electrical circuit is applied to the second winding means to in effect form a feedback circuit for the transducer. Preferably, the electrical circuit comprises an electrical amplifier followed by a phase adjusting circuit. It has been found that when the signal applied to the second winding from the first winding is 90° out of phase with and leading the output signal of the first winding the effective mass of the mass on which the windings are supported is greatly increased. It has also been found that when the signal applied to the second winding is in phase with the output signal of the first winding (i.e., zero phase shift) the structure behaves as an accelerometer, the output signal of which increases substantially linearly with frequency for constant velocity drive.

Objects and features of the invention not apparent from the above discussion will become evident upon consideration of the following detailed description of the invention taken in connection with the accompanying drawing.

DESCRIPTION OF THE PREFERRED EMBODIMENT

Figure 2:
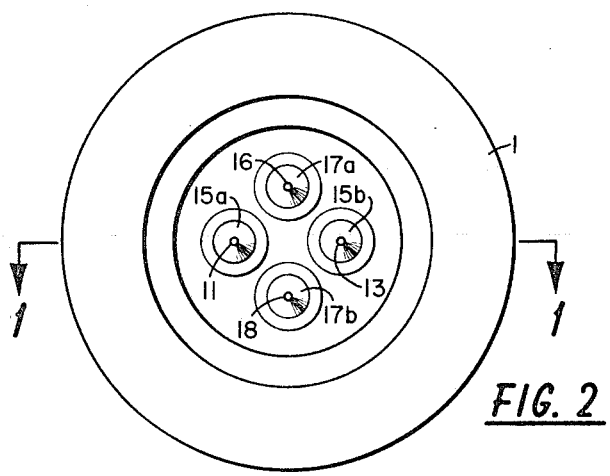
FIG. 2 is a top view of the geophone of FIG. 1.
Figure 1:
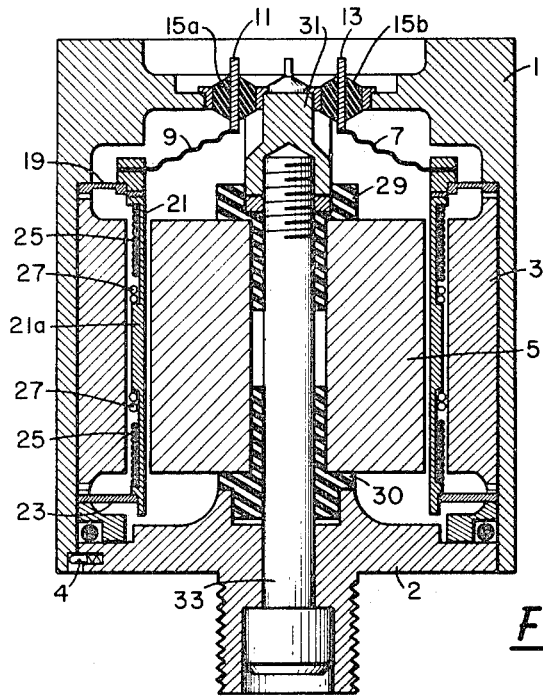
FIG. 1 is a cross-sectional view of a preferred velocity-type geophone such as is used in connection with the invention.

With reference now to FIG. 1, there is illustrated a preferred velocity-type geophone constructed in accordance with the invention. The geophone comprises a permanent magnet 5 supported by a structure comprising a case having an upper member 1 and having a separate bottom member 2 which is affixed to the upper portion 1 of the case by a spring-biased connector which is designated by the reference numeral 4. A bolt 33 extends through the center of the case bottom 2 into the interior of the central upper portion 31 of the case 1. Insulated members 29 and 30 support the magnet 5 on the bolt 33. An annular pole piece 3 is supported by the upper portion 1 of the case so that there is a small annular gap between the pole piece 3 and the magnet 5. Within the case there is positioned a coil form 21 which is supported from the upper portion 1 of the case by means of upper springs 19 and bottom spring member 23. The spring members illustrated are annular leaf springs. Separate coils or windings 25 and 27 are provided on the coil form 21. Each winding is physically divided into two sections by the thickened section 21 of the coil form so as to be connectable in a hum-bucking arrangement, as is used in geophones made by Geo Space Corporation of Houston, Tex., particularly Model HS–1. Winding 27 is shown as having four turns, but more or less than this number may be used. For the purpose of providing external electrical connections to the winding 25 and 27, there is provided a structure including electrodes 11, 13, 16, and 18 which are insulatively supported at the upper end of case member 1 and a terminal member 31 at the upper end of bolt 33. Insulators 15a, 15b, 17a, and 17b are positioned in openings in the upper portion of the case and respectively support the electrodes 11, 13, 16, and 18. Pigtails 7 and 9 extend from electrodes 11 and 13 to the coil form 21 and are connected to winding 25 by means of electrical wires (not shown) extending through the coil form. Winding 27 is similarly connected to electrodes 16 and 18 through pigtails (not shown) and thin wires which may extend through the coil form.

Figure 3:
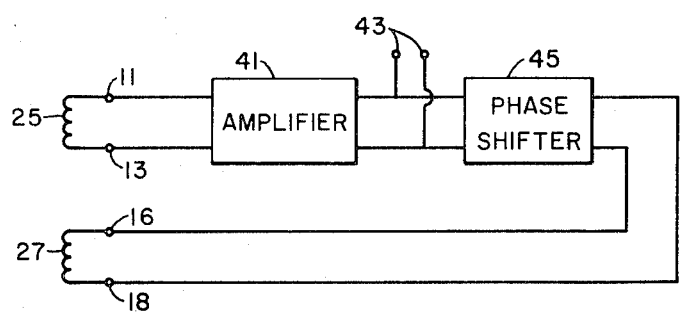
FIG. 3 is an electrical schematic diagram of a circuit in accordance with a preferred embodiment of the invention.

With reference now to FIG. 3, winding 25 is connected to the input circuit of an amplifier 41 which may be a conventional wide band data amplifier such as Amplifier Model C–44A made by Beckman Instruments, followed by a standard power amplifier such as Power Amplifier Model 467A made by Hewlett-Packard Company. The output of the amplifier 41 is connected to a phase shifter 45 which may be adjustable, if desired, and which may be a device described in Electronic Designers Handbook, Section 17, by R. W. Lander et al. (McGraw Hill, 1957). However, when it is desired to produce a low-frequency geophone, the phase shifter may be a simple capacitor having a reactance which is at least ten times greater than the effective resistance of the circuit such that the voltage applied to winding 27 is substantially 90 electrical degrees ahead of the voltage output of widing 25 appearing across terminals 11, 13. When it is desired to have the apparatus behave as an accelerometer the phase shifter 45 is omitted so that winding 27 is connected directly to amplifier 25. In this case, the current in the two windings 25, 27 must be in the same direction. If the windings are oppositely wound, the currents will be in opposite directions. The output signal of the system is taken across the output of amplifier 41 and appears across terminals 43. Preferably, amplifier 41 has a gain of at least 50.

The operation of the apparatus described above can be explained as follows. The output voltage of the winding 25 is $ABL_1V$ where:

A is the gain of amplifier 41
B is the flux density in the gap between the magnet and the pole piece
V is the velocity of the coil
and $L_1$ is the length of the wire in winding 25.

If the phase shift produced by the electrical circuits between the windings 25, 27 is zero, the current flowing in the winding 27 is given by the relationship $$I_2 = \frac{ABL_1V + BL_2V}{R_2 + Z_2}$$

where:

$Z_2$ is the series electrical impedance in winding 27
$R_2$ is the DC resistance of winding 27
and $L_2$ is the length of the wire in winding 27.
The inductance of both windings is assumed to be negligible. The force acting on the coil form due to the current $I_2$ is $$F = BL_2I_2$$

and the effective mechanical impedance of this electrical circuit is $$Z = \frac{F}{V} = \frac{BL_2I_2}{V} = \frac{B^2L_2(AL_1+L_2)}{R_2+Z_2}.$$

If $L_2$ is equal to $L_1$ and $Z_2$ is much smaller than $R_2$ and further, if A is much greater than L then the mechanical resistance is given by $$r = \frac{(BL)^2A}{R_2}$$

This compares to $$r = \frac{2(BL)^2}{R_2}$$

where there is no amplifier and the two coils are simply connected together. It can be seen, therefore, that the mechanical resistance or damping impedance is increased by a factor $A/2$ and the output signal of the geophone can be read at the output of the amplifier.

The effective mass of the coil form and winding thereon can be greatly increased by adjusting the phase of the current through winding 27 so that it leads the current through winding 25 by 90 electrical degrees. This can be done simply by making the phase shifter a simple high-quality capacitor in series circuit relationship in the line between amplifier 41 and winding 27, and making the effective resistance of the line as small as possible. In this case the mechanical impedance is given by $$Z = \frac{AB^2L_1L_2}{Z_2} = \frac{AB^2L_1L_2}{\frac{-i}{\omega C}} = i\omega AB^2L_1L_2C$$

so that the equivalent mass in the mechanical circuit is $m = AB^2L_1L_2C$. Assuming that the length of winding 25 is nine times the length of widing 27, that the phase shifting capacitor is five microfarads, that the amplification of amplifier 41 is 200 and that $BL = 40$ volts/m./sec. (a value obtainable with many geophones such as Type L–1 manufactured by Mark Products Incorporated of Houston, Tex.). With these values, the effective mass of the winding form of the geophone would be 144 grams which is a much larger moving mass than that obtainable with any except the most bulky low-frequency geophones. A typical moving mass of the winding and the coil form on which it is wound would be 37 grams for an ordinary geophone in which BL is 40 volts/m./sec.

By suitably adjusting the phase shifter 45 or by selecting fixed value circuit components that will give particular phase shifts, negative mechanical resistance, positive and negative stiffness, and positive and negative inertia can be realized. The most important applications of the invention, however, are those described above where an ordinary motion detector, such as a geophone, can be selectively converted into either an accelerometer or a very low-frequency motion detector having a small actual moving mass with stiff springs simply by varying or suitably selecting the relative phase of the output signal from winding 25 and the feedback signal applied to winding 27.

When the output impedance of amplifier 41 is much less than the resistance of winding 27, the output signal across terminals 43 is given by $$E = ABL_1 \frac{i\omega m V_g}{r + i(\omega m - K/\omega)}$$

where:

$V_g$ is the velocity of the geophone case
$m$ is the combined mass of the coil form and the windings thereon
$K$ is the stiffnes sof the springs 19, 23
$i$ is $\sqrt{-1}$
and $\omega$ is $2\pi F$.

With very large damping, $$E = ABL_1 i\omega m V_g / r$$
$$E = ABL_1 m A_g / r$$

or where $A_g$ is the acceleration of the geophone case.
When the coil form is made of a material such as Bakelite, Lucite, or other suitable plastic so that the eddy current therein is small, $$E = \frac{R_2}{BL_2} m A_g$$

Having described the principle of the invention and the best mode in which it is contemplated to apply that principle, it is to be understood that the apparatus described is illustrative only and that various changes can be made without departing from the true scope of the invention.

I claim:

1. A motion detector unit including first means for producing a magnetic field and a winding form suspended from said first means in said field, the improvement comprising:

(a) first and second electrical winding means supported by said winding form; and (b) circuit means connected to said first and second winding means for amplifying the output signal of said first winding and producing a predetermined phase relationship between the first output signal of the first winding means and the signal applied to the second winding means, said circuit means being connected in circuit relationship with said first winding means and said second winding means; said circuit means comprising electrical amplifier means for amplifying the output signal of said first winding means and phase shifting means for producing a predetermined phase relationship between the output signal of the amplifier means and the signal applied to the second winding means.

2. The apparatus of claim 1 wherein said phase shifting means adjusts the phase of the signal to said second winding means so that the signal to said winding means is 90 electrical degrees leading the output signal of said first winding means.

3. The apparatus of claim 1 wherein phase shifting means can adjust the phases of the signal applied to the second winding means in the range of zero to 180 degrees leading the signal from the first winding means.

4. The apparatus of claim 1 wherein the length of the first winding means is at least ten times the length of the second winding means and wherein the resistance of the circuit means is negligible as compared to its reactance.

References Cited

FOREIGN PATENTS 818,868   10/1951   Germany _____ 340—17

ALFRED E. SMITH, Primary Examiner

U.S. Cl. X.R.

340—17, 262